United States Patent [19]
Kalkunte et al.

[11] Patent Number: 5,850,525
[45] Date of Patent: Dec. 15, 1998

[54] METHOD AND APPARATUS FOR ADDING A RANDOMIZED PROPAGATION DELAY INTERVAL TO AN INTERFRAME SPACING IN A STATION ACCESSING AN ETHERNET NETWORK

[75] Inventors: Mohan Kalkunte, Sunnyvale; Gopal Krishna, San Jose; Jim Mangin, San Ramon, all of Calif.

[73] Assignee: Advanced Micro Devices, Inc., Sunnyvale, Calif.

[21] Appl. No.: 625,056

[22] Filed: Mar. 29, 1996

[51] Int. Cl.[6] .................................................. G06F 13/36
[52] U.S. Cl. .............................. 395/200.65; 395/200.6; 370/447
[58] Field of Search .......................... 395/200.3, 200.48, 395/200.55, 200.57, 200.62, 200.66, 200.6, 200.61, 200.65, 200.67; 370/445, 447, 448

[56] References Cited

U.S. PATENT DOCUMENTS

| | | | |
|---|---|---|---|
| 5,319,641 | 6/1994 | Fridrich et al. | 370/447 |
| 5,353,287 | 10/1994 | Kuddes et al. | 370/448 |
| 5,404,353 | 4/1995 | Ben-Michael et al. | 370/445 |
| 5,418,784 | 5/1995 | Ramakrishnan et al. | 370/445 |
| 5,422,887 | 6/1995 | Diepstraten et al. | 370/448 |
| 5,436,903 | 7/1995 | Yang et al. | 370/448 |
| 5,446,735 | 8/1995 | Tobagi et al. | 370/445 |
| 5,526,355 | 6/1996 | Yang et al. | 370/448 |
| 5,533,025 | 7/1996 | Fleck et al. | 370/445 |
| 5,544,196 | 8/1996 | Tiedemann, Jr. et al. | 375/200 |
| 5,642,360 | 6/1997 | Trainin | 370/230 |

FOREIGN PATENT DOCUMENTS

| | | |
|---|---|---|
| 0632621 | 1/1995 | European Pat. Off. . |
| 92/10041 | 6/1992 | WIPO . |

OTHER PUBLICATIONS

Comer, D.E., et al., "A Rate–Congested Avoidance and Control Scheme for Packet Switched Networks," Proceedings of the International Conference on Distributed Computing Systems, Paris, May 28–Jun. 1, 1990, Conf. 10, 28 May 1990, IEEE, pp. 390–397.

Williamson, C.L., et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, 3 Sep. 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, 2 Jan. 1988, New York, pp. 72–76.

AMD, AM79c970 PCnet™–PCI Single–Chip Ethernet Controller for PCI Local Bus, Jun. 1994, pp. 1–868—1–1033.

*Primary Examiner*—Parshotam S. Lall
*Assistant Examiner*—Viet Vu

[57] ABSTRACT

Delay times are modified in Ethernet network devices by adding a randomized time interval generated in accordance with a propagation delay between two network stations. A server in a client-server arrangement is given priority access over clients by adding to the clients' InterPacket Gap (IPG) interval a random time delay between one and two times the cable delay between the server and the corresponding client. The server can access the network media after the IPG interval, whereas clients must wait the additional random time delay before accessing the media, thereby improving server throughput and overall network throughput. Collision mediation is improved by adding a randomly selected integer multiple of a propagation delay between two stations, where the integer multiplier is randomly selected from a predetermined range of integers. The randomly selected integer multiple of the propagation delay provides a second dimension of random selection to minimize subsequent collisions and minimize the occurrence of capture effects in losing stations.

27 Claims, 10 Drawing Sheets

METHOD AND APPARATUS FOR ADDING A RANDOMIZED PROPAGATION DELAY INTERVAL TO AN INTERFRAME SPACING IN A STATION ACCESSING AN ETHERNET NETWORK

FIELD OF THE INVENTION

The present invention relates to network interfacing and more particularly, to methods and systems efficiently accessing Ethernet media.

DESCRIPTION OF THE RELATED ART

Local area networks use a network cable or other media, to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff algorithm, which provides a controlled pseudorandom mechanism to enforce a collision backoff interval before retransmission is attempted. According to the truncated binary exponential backoff algorithm, a station keeps track of the number of transmission attempts (N) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of slot times from the range of zero to $2^N-1$. For example, if the number of attempts N=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10-1}$.

The truncated binary exponential algorithm has the disadvantage that the range of randomly selected time slots (0, $2^N-1$) increases exponentially each time a specific station loses a retry attempt after collision, resulting in a higher probability that during the next collision mediation the station will randomly select a larger integer multiple of time slots and lose the next collision mediation. Thus, a new station that has data to transmit has a higher probability of winning a collision mediation than the station having a greater number of attempts. This effect is known as the capture effect, wherein a new station in the collision mediation effectively has a greater probability of capturing access to the media than the losing station until the maximum number of attempts has been reached. The capture effect can be substantial when two stations are on the network. The capture effect may also be present with additional stations that tend to win collision mediations. Moreover, the usable bandwidth of the network is reduced due to the increased collisions and idle time generated during the collision mediation.

The capture effect also affects the throughput of a server in a client-server architecture of an Ethernet network, where clients request data from the server. The data requests from the clients typically are formed from a small number of frames, whereas the server sends substantially larger data files to the clients in multiple data frames. If network traffic causes an increase in collision rate, the throughput of the server decreases as the rate of client requests increases because the server needs to contend equally with the clients for access to the network.

DISCLOSURE OF THE INVENTION

There is a need for a method of accessing media of an Ethernet network that increases the throughput of the Ethernet network under heavy traffic loads.

There is also a need for a method of accessing media of an Ethernet network that enables a server to maintain sufficient throughput to accommodate an increased rate of client requests.

There is also a need for mediating collisions on the media of an Ethernet network that increases the efficiency of the network under heavy loads.

There is also a need for a method of mediating collisions of media of an Ethernet network that avoids subsequent collisions.

These and other needs are attained by the present invention, whereby the delay time between sensing activity on the media and attempting access of the media is modified by a randomized time interval generated in accordance with a propagation delay between any two network stations.

According to one aspect of the present invention, a method of accessing media of an Ethernet network includes the steps of sensing deassertion of a receive carrier on the media, determining a delay time including at least a predetermined interpacket gap interval and a randomized time interval based on a propagation delay between any two network stations, and attempting access of the media in response to the sensed deassertion and after the determined delay time. The addition of a randomized time interval on the basis of propagation delay between any two network stations to the delay time enables a winning station to have time to transmit data, such that other stations are able to sense the transmitted data activity on the media. By adding the randomized time interval to client stations in a client-server arrangement, the method of the present invention enables the server to have a higher priority than the clients, minimizing server-client collisions on the network media. The randomized time interval also provides a collision avoidance mechanism, since the increased randomness based on propagation delay enables stations to detect activity generated by a winning station.

In another aspect of the present invention, a method of managing access to a media of an Ethernet network having a server and clients includes the steps of assigning a first delay time to the server equal to a predetermined interpacket gap interval, enabling the server to access the media in response to deassertion of a receive carrier on the media and after the first delay time, assigning a second delay time to each of the clients equal to the predetermined interpacket gap interval plus a time interval randomly selected with respect to a propagation delay between two network stations, and enabling each of the clients to access the media in response to the deassertion of the receive carrier and after the second delay time. The server has a higher priority to transmit than the clients, improving throughput of the network under heavy loads. The higher priority assigned to the server also enables the server to send relatively large data files to the clients in a more efficient manner as the rate of client requests increases.

Still another aspect of the present invention provides a method of mediating collisions on media of an Ethernet network, comprising the steps of sensing a collision on the media, determining a collision delay interval by multiplying a propagation delay interval representing a maximum propagation delay between any two stations on the network with a randomly selected integer from a predetermined range of integers to obtain a randomized delay interval, and then attempting access of the media in response to the detected collision and after the collision delay interval. Each mediating station randomly selects a randomized delay interval equal to at least the maximum propagation delay between two stations, minimizing occurrences of the capture effect. Moreover, mediating stations will detect the winning station by waiting a sufficient time for the transmitting signals from the winning station to propagate to the other mediating stations. Hence, the collision mediation of the present invention increases the throughput and usable bandwidth on the network, and decreases the delay per transmitted frame.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
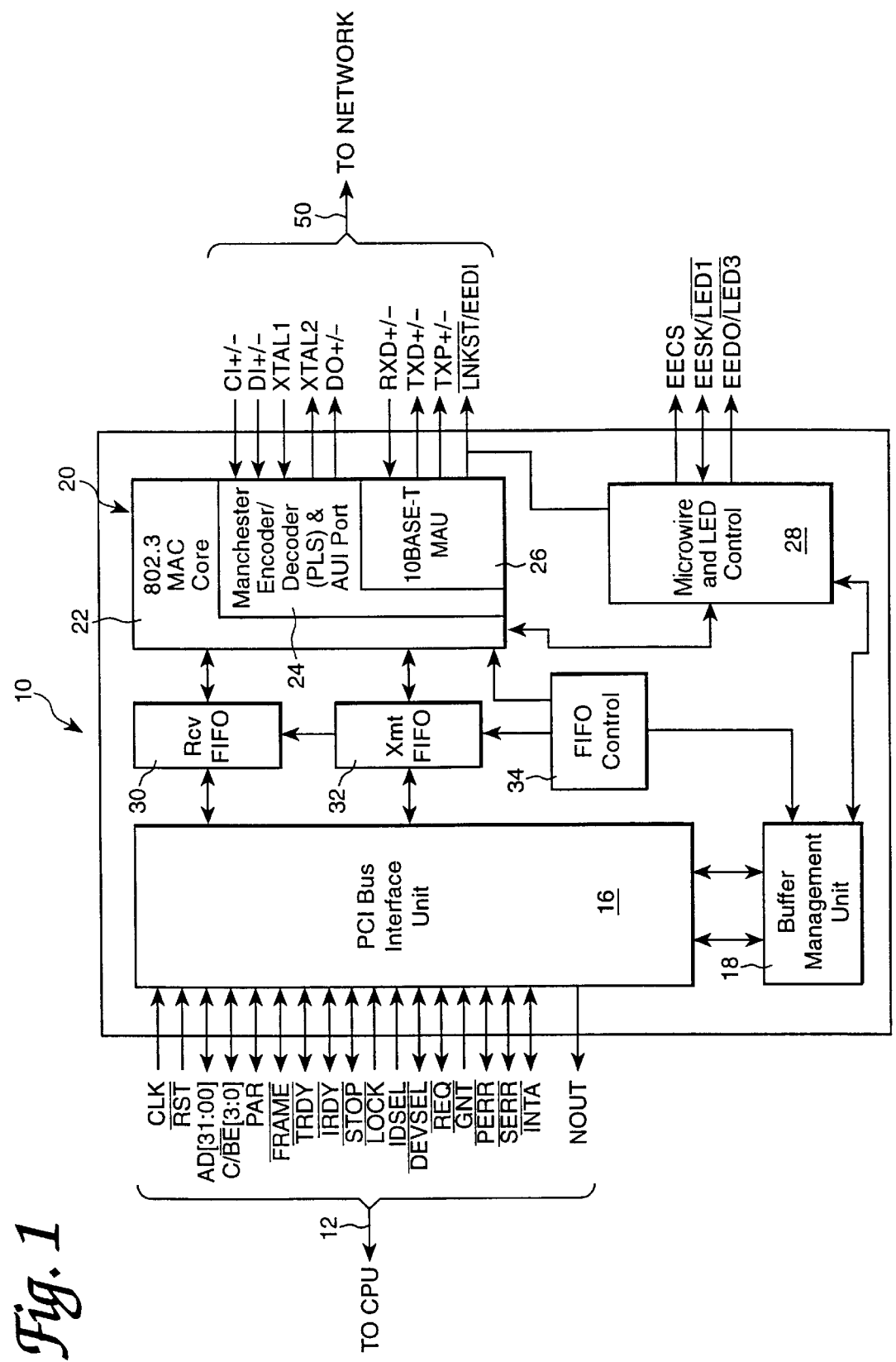
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention, resulting in increased throughput on the network during heavy traffic, and reduced collisions.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1-868 to 1-1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD.

Figure 2:
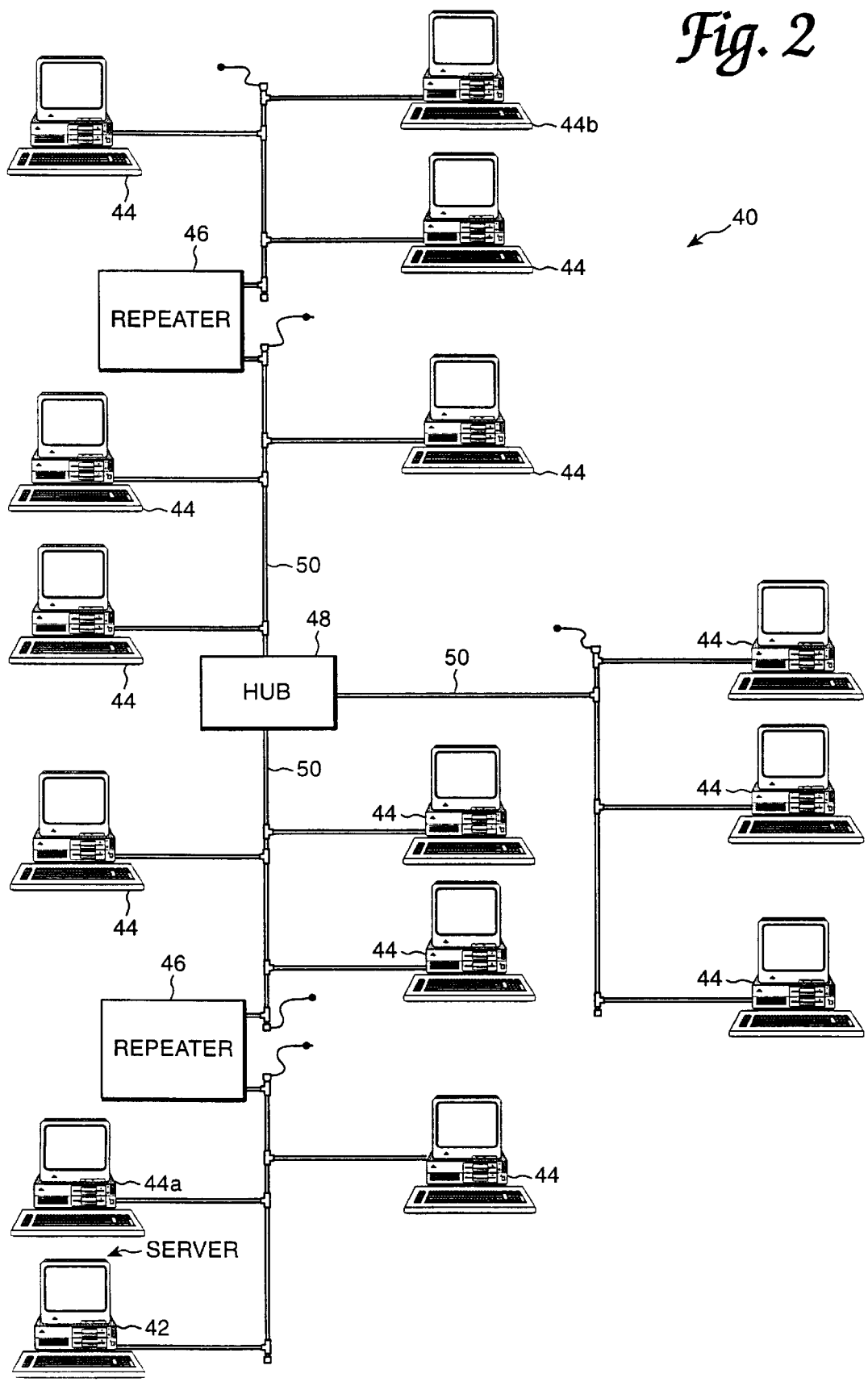
FIG. 2 is a diagram illustrating an Ethernet network.

FIG. 2 is a diagram of an Ethernet network for implementing the media access techniques of the present invention. The network 40 is compliant with the ISO/IEC 8802-3 (ANSI/IEEE 802.3) standards and includes a server 42 connected to a plurality of client stations 44. The network 40 also includes repeaters 46 and a wiring hub 48 that provides a central connection point for the cables 50 that connect the stations 42 and 44 to the network 40. The cables 50, also referred to as the media, may be either coaxial, fiber optic, or twisted pair wire, and hence the network 40 may implement 10BASE-T, 10BASE-2, 100BASE-TX, 100BASE-T4, or 100BASE-FX networks. The disclosed network 40 may operate at either 10 megabits per second or 100 megabits per second.

The server 42 responds to requests from any of the clients 44 by sending requested files to the clients. Requests from the clients 44 tend to be small frames, whereas the server 42 generally sends large data files, transmitted as multiple data frames across the network 40. According to the present invention, the throughput of the network 40 is increased by prioritizing the server 42 to have a minimal delay time consisting of a predetermined interpacket gap interval when accessing the media 50. Each of the clients is assigned a delay time that includes the IPG interval plus a randomly selected interval within the range of $\tau$ and $2\tau$, whereby the value $\tau$ equals the maximum one-way propagation delay between the corresponding client 44 and the server 42. Thus, the value of $\tau$ for each client 44 will vary depending on the topology of the network 40.

The assignment of different delay times between the server and the clients can be implemented by embedding in a memory element in the MAC 22 (e.g., register, EPROM, EEPROM) the method of accessing the media by the MAC 22 in each of the network interface cards of the clients 44 and the server 42.

The priority to the server 42 may also be selectively assigned when the server 42 determines that heavy loads are present on the network. In such a case, the server 42 will respond to detecting heavy loads by outputting a message to all the clients 44 to begin execution of the media access management of the present invention. If desired, the server 42 may include the value $\tau$, up to a maximum of 2.56 microseconds on a 100 megabit per second hub, in the message to the clients 44. The message to the clients 44 may also include a propagation delay interval ($\Delta X$) to be used for collision mediation. As described below, the propagation delay interval ($\Delta X$) represents the maximum propagation delay between any two stations 44a and 44b, i.e., the maximum time needed between any two stations to know that there is activity on the network. The value $\tau X$ can be up to 2.56 microseconds for a 100 megabyte per second network.

Figure 3A:
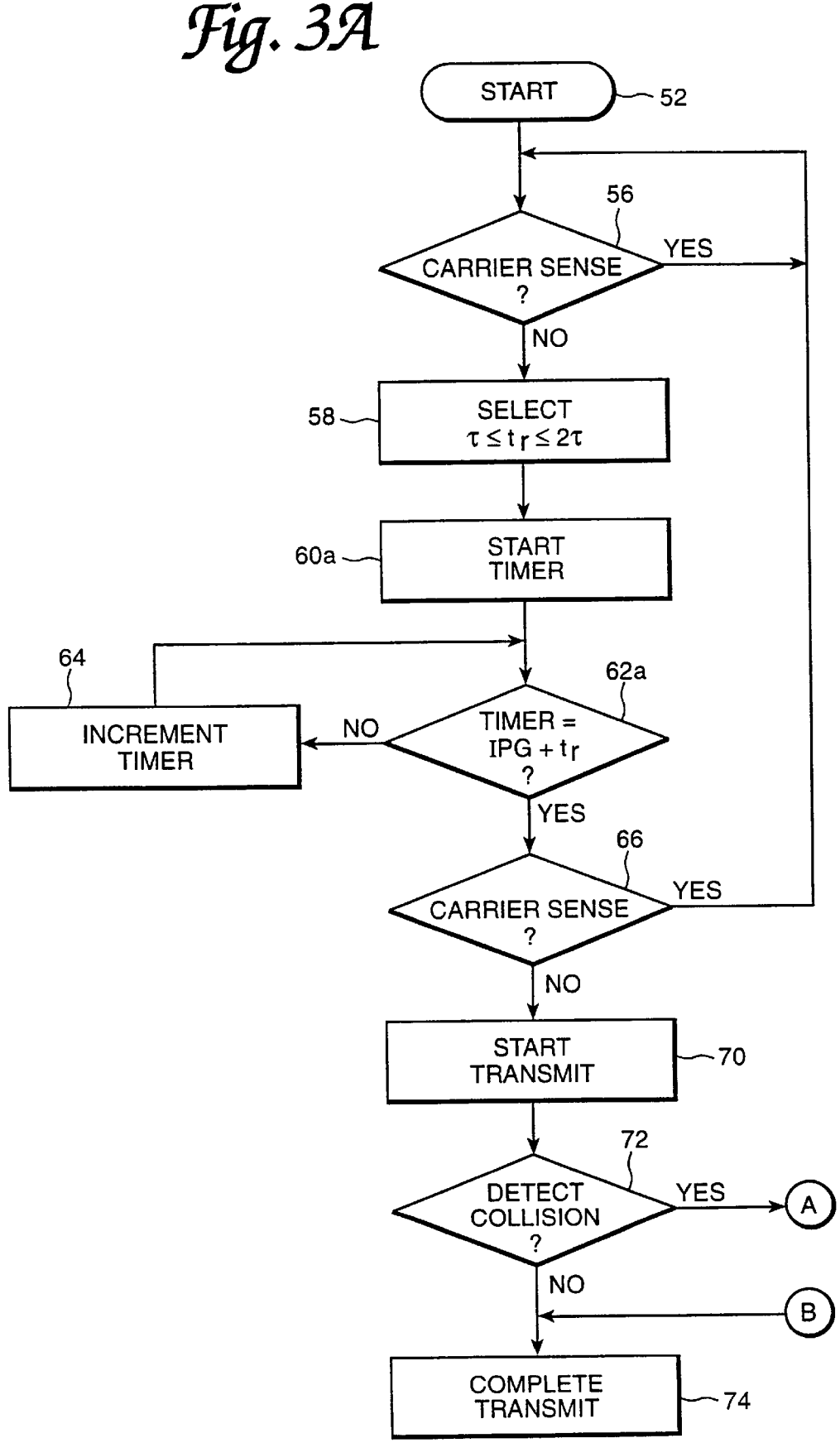
FIGS. 3A, 3B and 3C are flow diagrams of the method for accessing media of the Ethernet network according to the present invention.
Figure 3B:
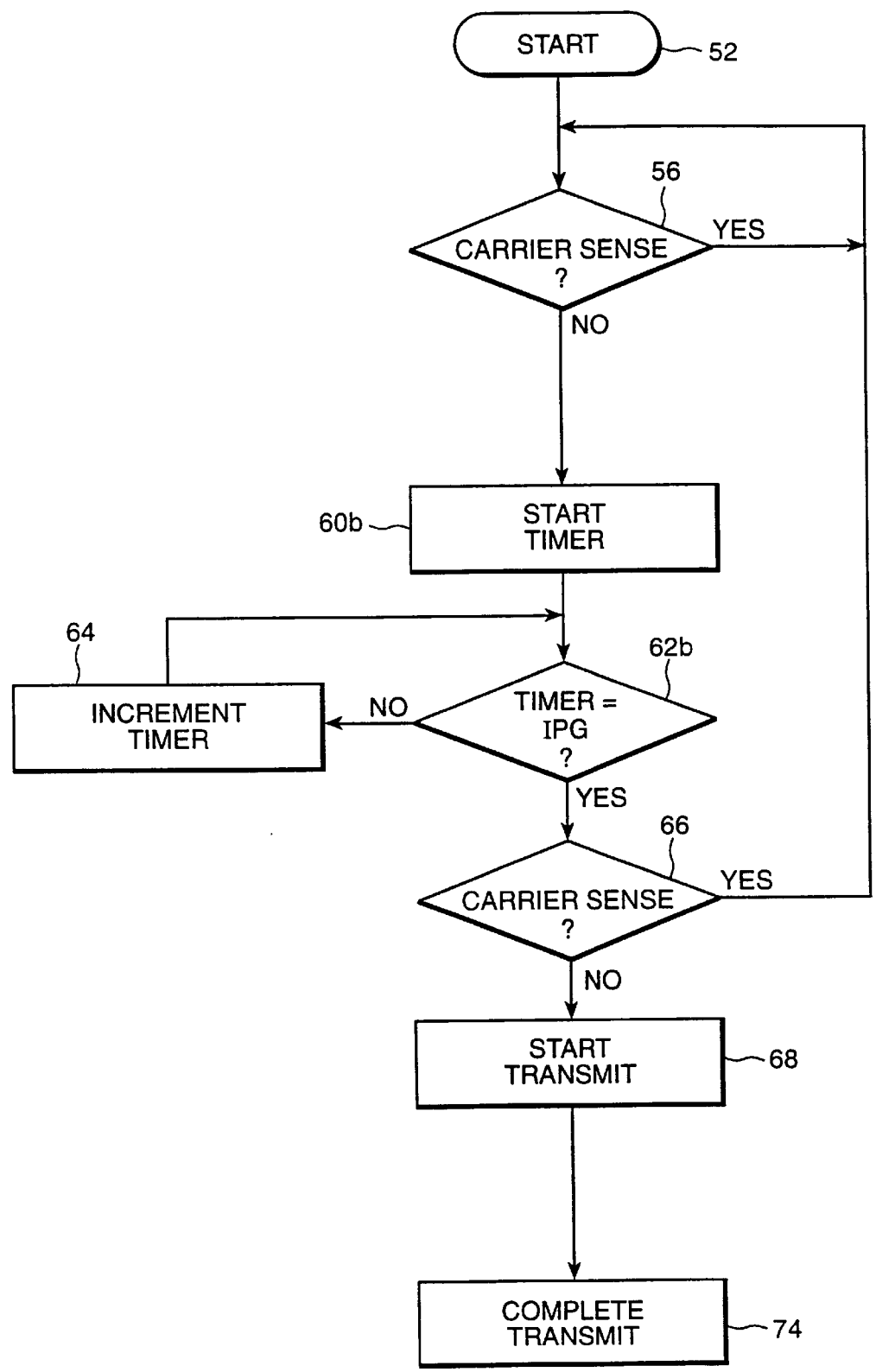

FIG. 3A is a flow diagram of a method by a client 44 of accessing the media 50 of an Ethernet network in the Ethernet network 40 of FIG. 2. FIG. 3B is a flow diagram of the method by the server 42 of accessing the media 50. The delay time for transmitting by the client 44 after sensing deassertion of a receive carrier on the media 50 is modified by adding a randomized time interval to the interpacket gap (IPG), enabling the server 42 to have priority on the network.

The process for the client 44 and the server 42, executed by the media access controller (MAC) 22 in each corresponding network interface 10, starts in FIGS. 3A and 3B respectively in step 52, during which point the Ethernet media 50 is busy with transmission activity by a station. The process for the client 44 and the server 42 then check in step 56 if a receive carrier is sensed on the media 50 using the CSMA/CD, indicating that the network 40 is busy. If the receive carrier is sensed, the MAC 22 waits until deassertion of the receive carrier on the media 50 is detected. The MAC 22 in each client 44 attempting access then randomly selects a randomized time interval $t_r$ between and including the values of $\tau$ and $2\tau$ in step 58, and then proceeds to start a delay timer in step 60a.

As shown in FIG. 3B, the server 42 has priority over the clients 44, and has a delay time consisting of the predetermined IPG interval. Hence, the MAC 22 of the server 42 begins the delay timer in step 60b without randomly selecting the time interval $t_r$.

The client 44 and the server 42 check the delay timer values in steps 62a and 62b, respectively, and increment the delay timers in step 64 until the delay time is reached. As shown in FIG. 3B, the server 42 checks in step 66 if the carrier is detected on the media 50 in step 66. If no carrier is detected and the transmit FIFO 32 of the server 42 has data to send, the server 42 starts to transmit in step 68. Thus, the server 42 transmits the data in the transmit FIFO 32 after the delay timer equals the IPG value. According to the disclosed embodiment, the IPG equals 9.6 microseconds for a 10 megabit per second network, and 0.96 microseconds for a 100 megabit per second network. The delay timer in the client 44, however, continues to count for the additional randomized time interval $t_r$. Once the delay timer reaches the delay time of the IPG interval plus the randomized time interval $t_r$, the MAC 22 of the client 44 proceeds to step 66 to sense if a carrier is present. If a carrier is present, then the MAC 22 of the client 44 returns to the wait state in step 56.

Thus, the addition of the randomized time interval in the delay time of the clients 44 enables the server 42 to maintain priority transmission on the network. When both server 42 and clients 44 are contending for access, the server 42 will be able to transmit first at least fifty percent of the time.

If in step 68 the client 44 does not detect a carrier, the MAC 22 in the client 44 starts to transmit in step 70 if data is stored in the transmit FIFO 32 of the client 44. After transmission has begun in step 70, the client station 44 checks in step 72 to determine whether a collision has been detected. If no collision is detected, then transmission is completed in step 74. If a collision has occurred with another network station, then the MAC 22 performs collision mediation, shown in FIG. 3C.

Collision mediation begins by initializing an internal collision counter in step 76 and incrementing the collision counter in step 78. The MAC 22 then checks in step 80 if the number of collisions (N) is greater than or equal to ten. The MAC 22 then randomly selects an integer (A) from a predetermined range in step 82, for example the range 1, 2, 3. If the number of collisions N is greater than or equal to 10, the MAC 22 then checks in step 84 if the number of collisions is equal to 16. If the number of collisions is equal to 16, then the frame to be transmitted is discarded in step 86.

If the number of attempts is not equal to 16 in step 84, then an exponential number of access attempts (B) is determined in step 88. Specifically, if the number of access attempts is less than 10, then the exponential number of access attempts in step 88a is equal to $B=2^N-1$, whereas if N is greater than or equal to 10, then the exponential number of access attempts is set in step 88b to $B=2^{10}-1$, or 1,023. After calculating the exponential number of access attempts B, the MAC 22 randomly selects an integer value C in step 90 from the range between 0 and the exponential number of access attempts B having a maximum value of 1,023. The first randomly-selected number (A) and the secondly randomly-selected number (C) are then applied in step 92 to generate the delay time according to the formula:

$$t_d = A\Delta X + Ct_s.$$

Thus, the delay time $t_d$ is calculated in step 92 based on a two-dimensional randomized selection of the slot time $t_s$ and a propagation delay ΔX. The value AΔX represents a randomized integer multiple of the maximum time needed between any two stations to detect activity on the network. The value $Ct_s$ represents a randomized integer multiple of slot times, whereby the slot time $t_s$ is 51.2 microseconds in a 10 megabit per second network, and 5.12 microseconds in a 100 megabit per second network.

The combined delay time thus avoids collision by adding the random time sufficient to enable a station to detect transmission from a winning station. In addition, the random selection from the predetermined range reduces the capture effect in stations having repeated collisions.

After the delay time is calculated in step 92, the MAC 22 uses an internal collision delay counter to wait in step 94 for the calculated delay time $t_d$. The MAC 22 then checks in step 96 whether a carrier is sensed on the media. If a receive carrier is asserted on the media, the MAC 22 waits in step 97 until deassertion of the receive carrier is sensed. Although not shown, waiting in step 97 includes waiting at least for the IPG interval (steps 62 and 64). If the carrier is not sensed in step 96, then the MAC 22 attempts access of the media in response to the collision detected in step 72 and after the collision delay interval $t_d$ in step 94. If a collision occurs in step 100, the process returns to step 78. If no collision is detected, then the process returns to step 74 to complete transmission.

Figure 4:
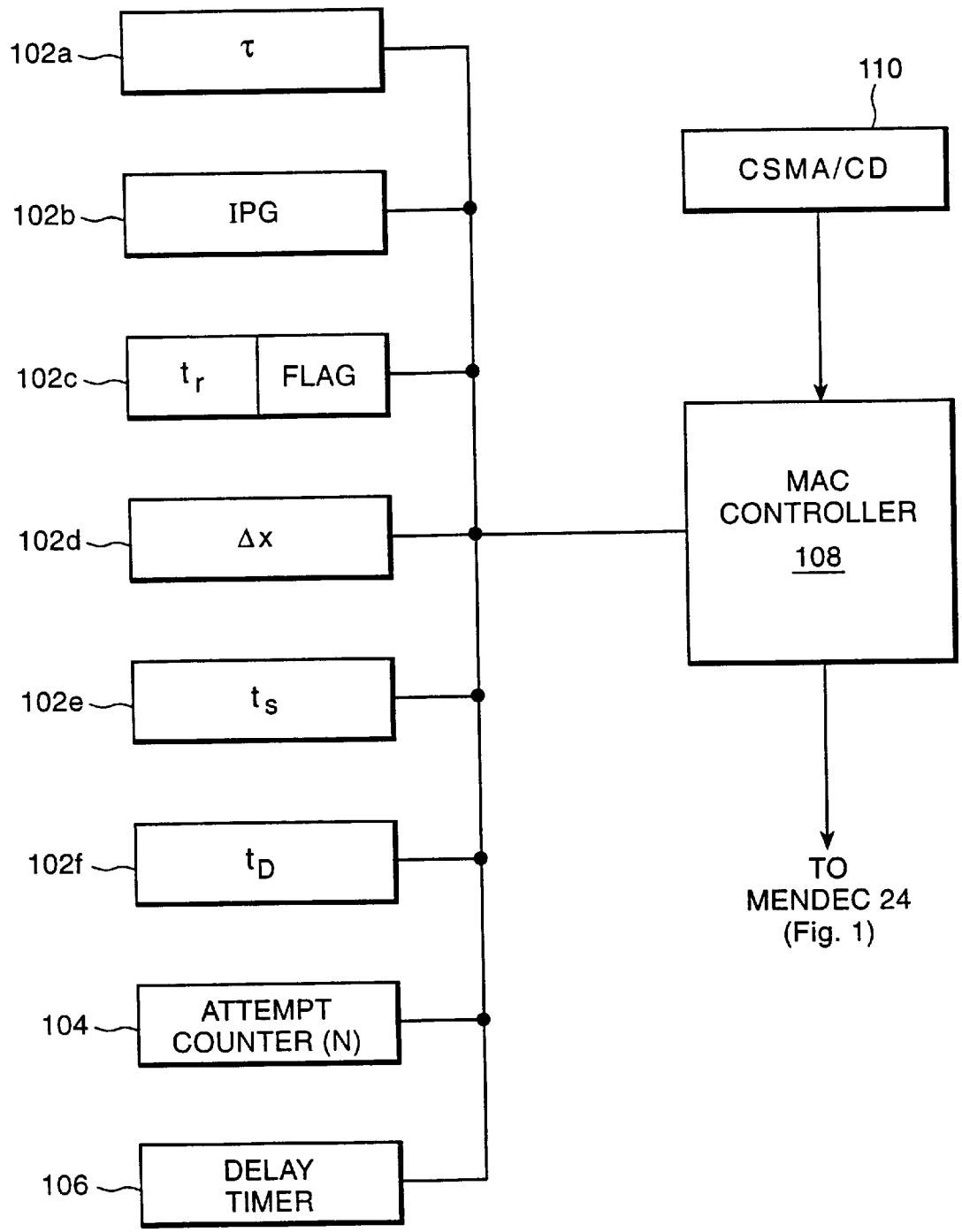
FIG. 4 is a block diagram of the media access control (MAC) of FIG. 1.

FIG. 4 is a block diagram illustrating the functional components of the MAC 22. The media access control 22 includes a plurality of registers 102, a collision counter 104 storing the number of access attempts (N), a delay timer 106 that counts the delay interval, a controller 108 and a carrier sense multiple access/collision detection portion 110. The values of τ, IPG, ΔX, $t_s$ stored in registers 102a, 102b, 102d and 102e may either be pre-loaded in an EEPROM, or supplied in a message from the server 42 when traffic is heavy. The register 102c stores a flag (FLAG) indicating calculation of the value $t_r$ according to the method of FIG. 3A is to be performed, as well as the value $t_r$ itself. The MAC controller 108, also referred to as a delay time calculator, calculates the delay time $t_d$, described above, and stores the resulting delay time in register 102f.

The MAC controller 108 starts the delay timer 106 in response to a signal from the CSMA/CD 110 indicating that deassertion of the receive carrier on the media has been sensed. The MAC controller 108 sends an instruction to the Manchester encoder/decoder 24 (MENDEC) to attempt access to the media after the delay timer has reached the determined delay time $t_d$ stored in register 102f.

Figure 3C:
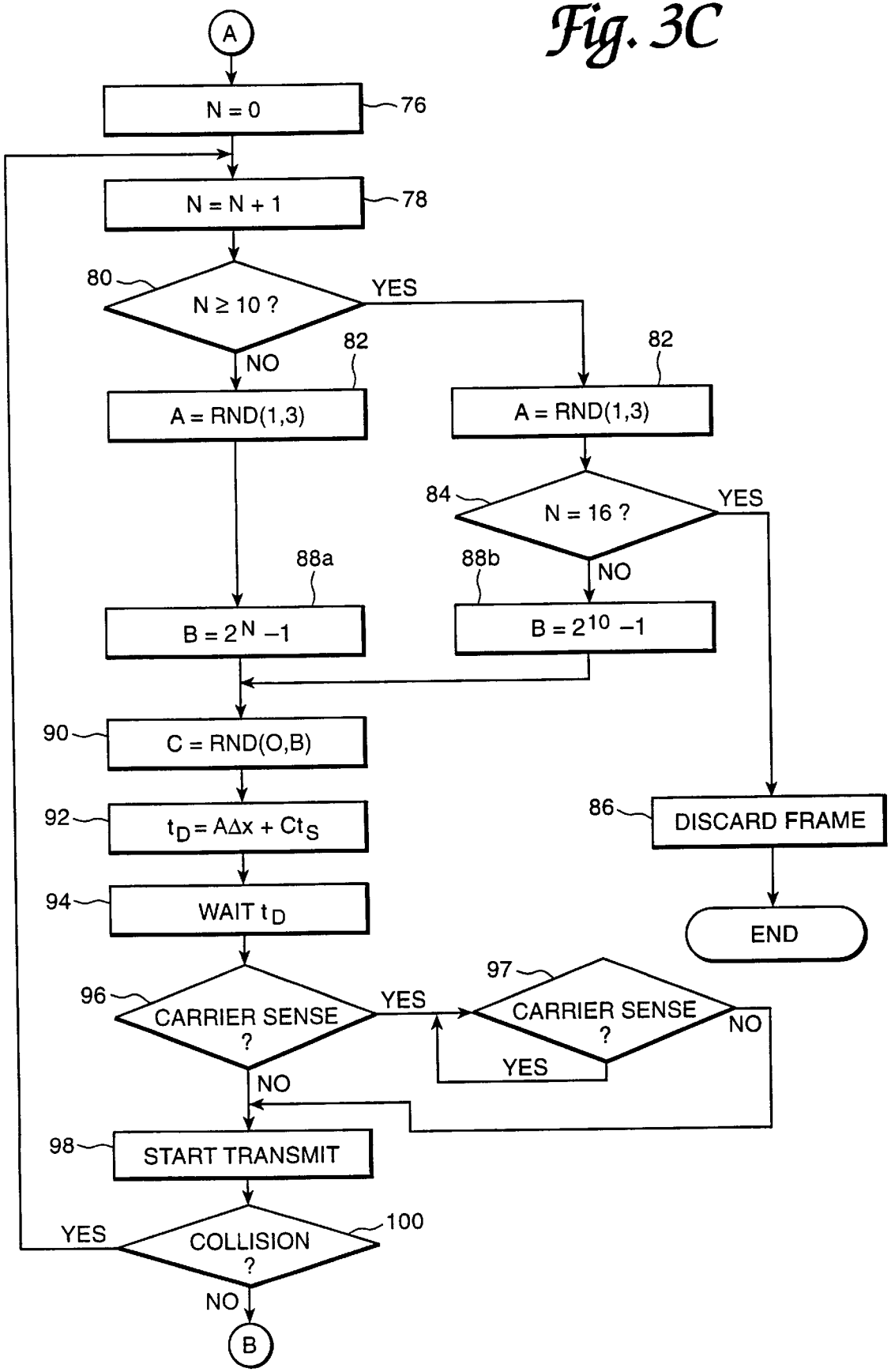

According to the present invention, the addition of a randomized time interval to the delay time on the basis of propagation delay between two network stations enables a winning station to have time to transmit data, such that other stations are able to sense the transmitted data activity on the media. Adding the randomized time interval to client stations also enables the server to have a higher priority than the clients, minimizing collisions between the server and clients contending for the network media. Adding randomized delays during access in FIG. 3A and during collision mediation in FIG. 3C is consistent with Ethernet protocol because the protocol specifies only minimum delay times. Hence, adding the randomized delay times improves the throughput of the network and the server during heavy traffic conditions.

Figure 5A:
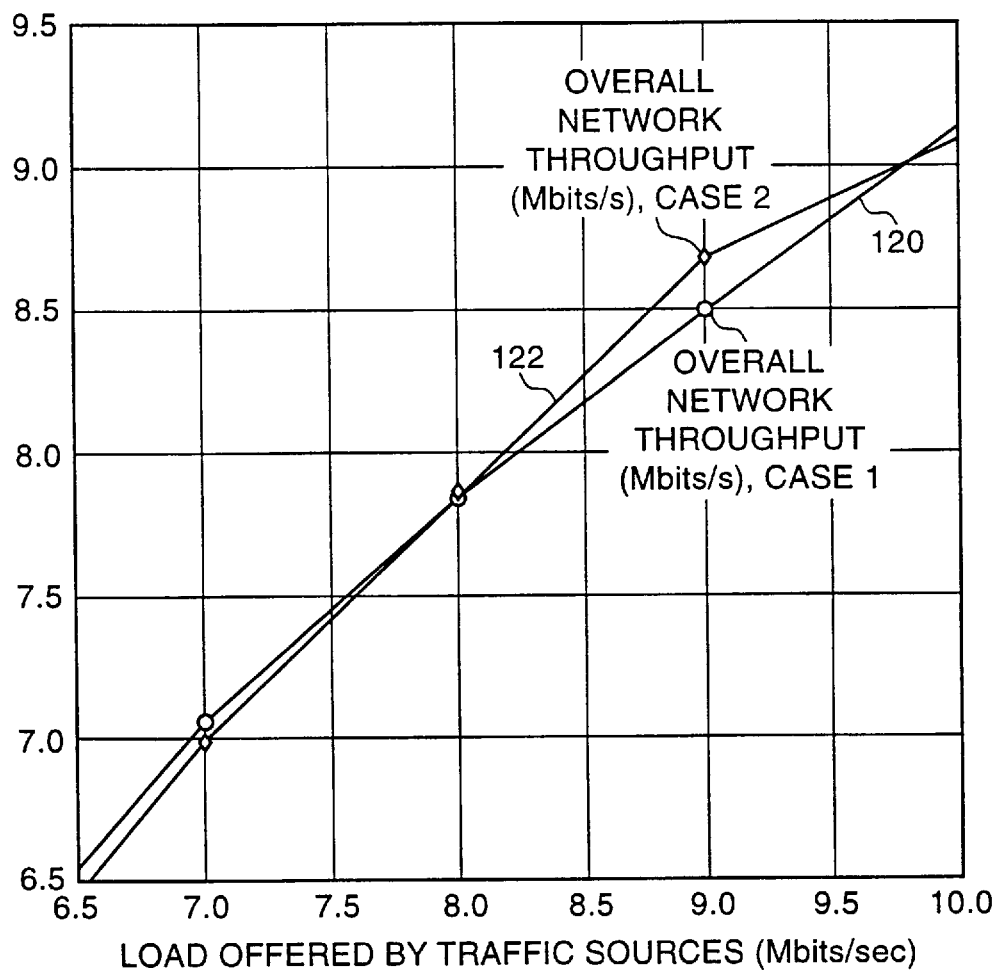
FIGS. 5A, 5B and 5C are graphs illustrating the improvement in network throughput by assigning a priority delay time to the server according to the present invention.
Figure 5B:
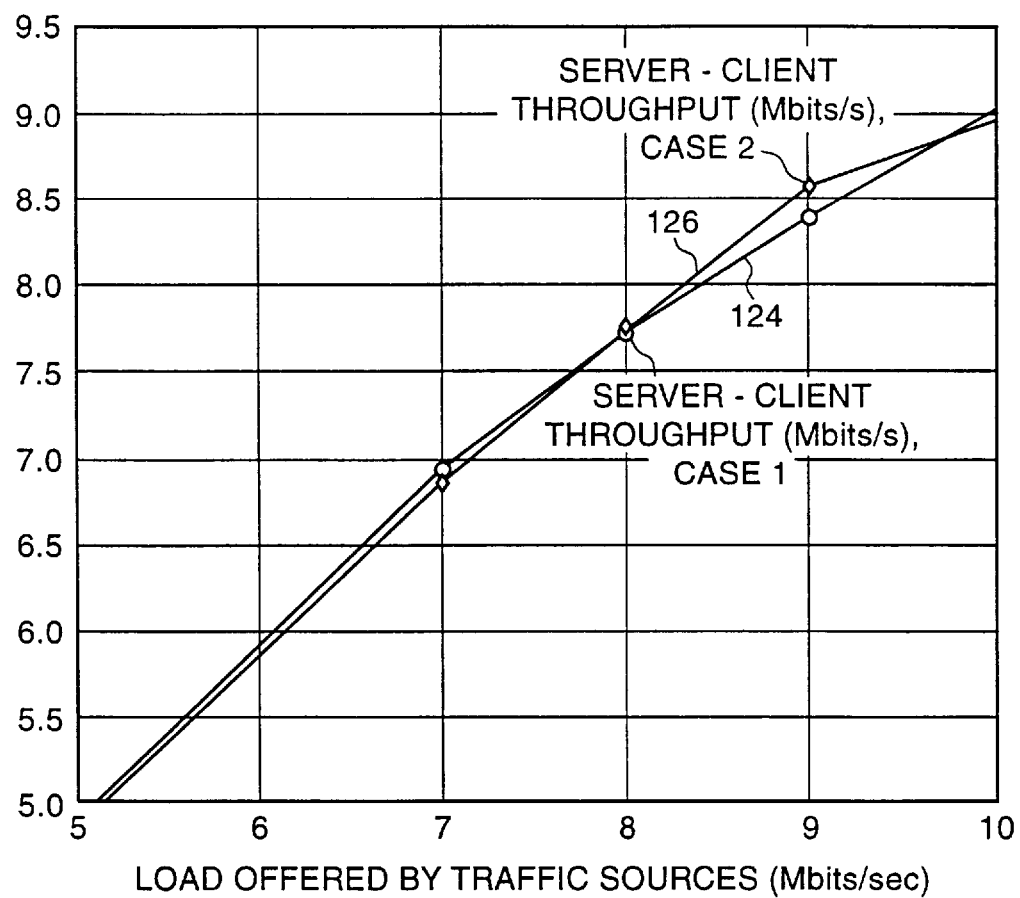
Figure 5C:
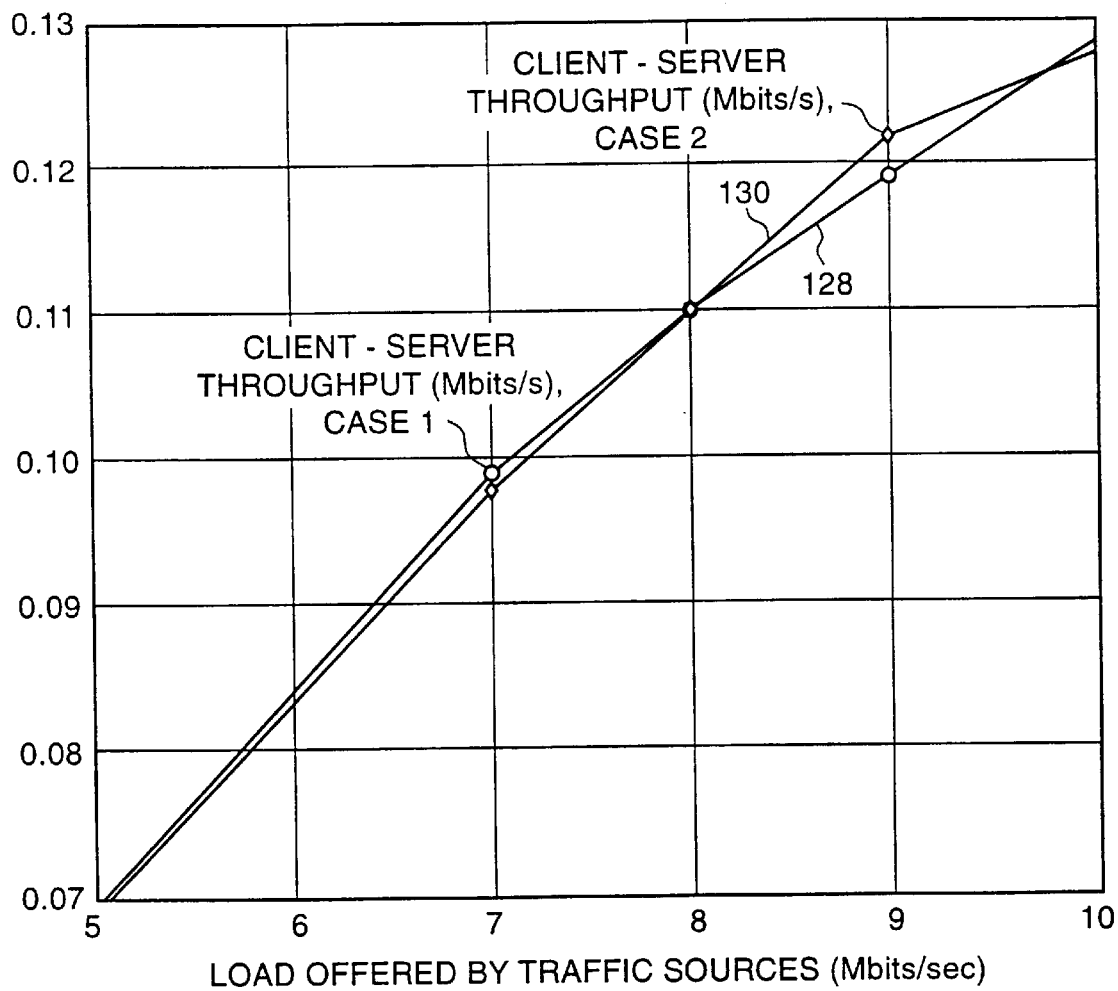

FIGS. 5A, 5B and 5C illustrate throughput improvement in a 10 MBit/s Ethernet network having nine clients and one server. FIG. 5A is a graph comparing overall network throughput using the method of the present invention compared with the prior art. Network throughput curve 120 illustrates the overall network throughput in a conventional 10 Mbit/s Ethernet network, and network throughput curve 122 illustrates the overall network throughput using the method of the present invention. The network throughput curve 122 shows that the method of the present invention improves the overall network throughput as network traffic increases, i.e., when the load offered by traffic sources is between approximately 7.5 Mbit/s and 9.75 MBit/s.

FIG. 5B is a graph comparing server-client throughput using the method of the present invention compared with the prior art. The server-client throughput curve 126 of the present invention compared with the server-client throughput curve 124 of a conventional 10 Ethernet network illustrates that the method of the present invention improves the server-client throughput as network traffic increases, i.e., when the load offered by traffic sources is between approximately 7.5 Mbit/s and 9.75 MBit/s. Similar results are found in FIG. 5C, which compares a client-server throughput curve 130 in an Ethernet network using the present invention with a client-server throughput curve 128 for a conventional Ethernet network.

Hence, improved performance was obtained in curves 122, 126, and 130 by changing the delay time $t_d$ in clients 44 by adding the random delay time $t_r$.

The randomized time interval of the present invention also provides an improved collision avoidance mechanism, since the increased randomness based on propagation delay enables stations to detect activity generated by a winning station. Hence, delays in frame transmission are reduced, increasing the frame throughput.

Figure 6A:
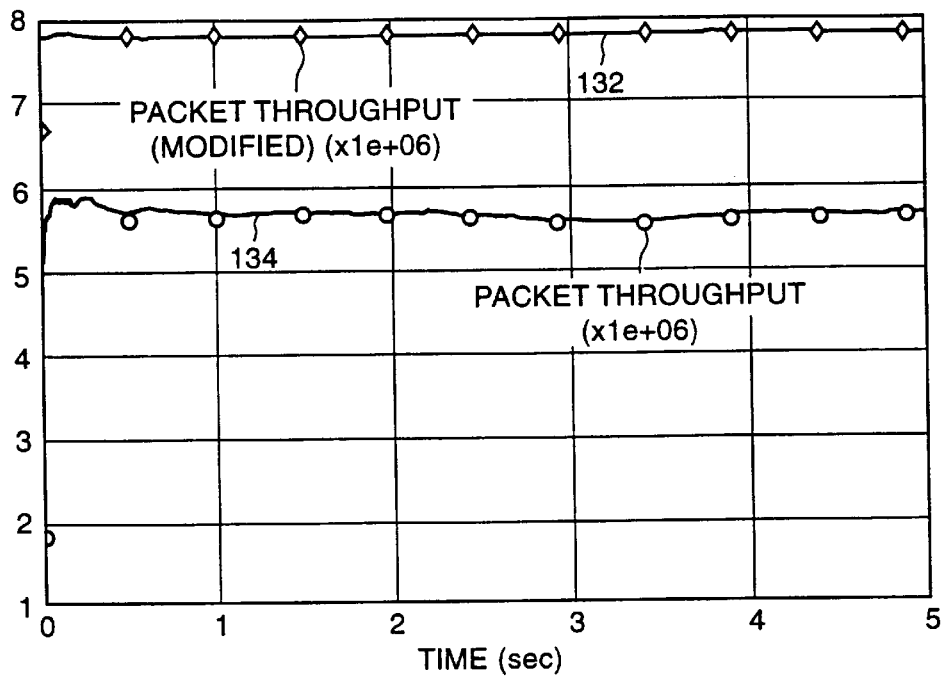
FIGS. 6A and 6B are graphs illustrating the network performance improvement by mediating collisions according to the present invention.
Figure 6B:
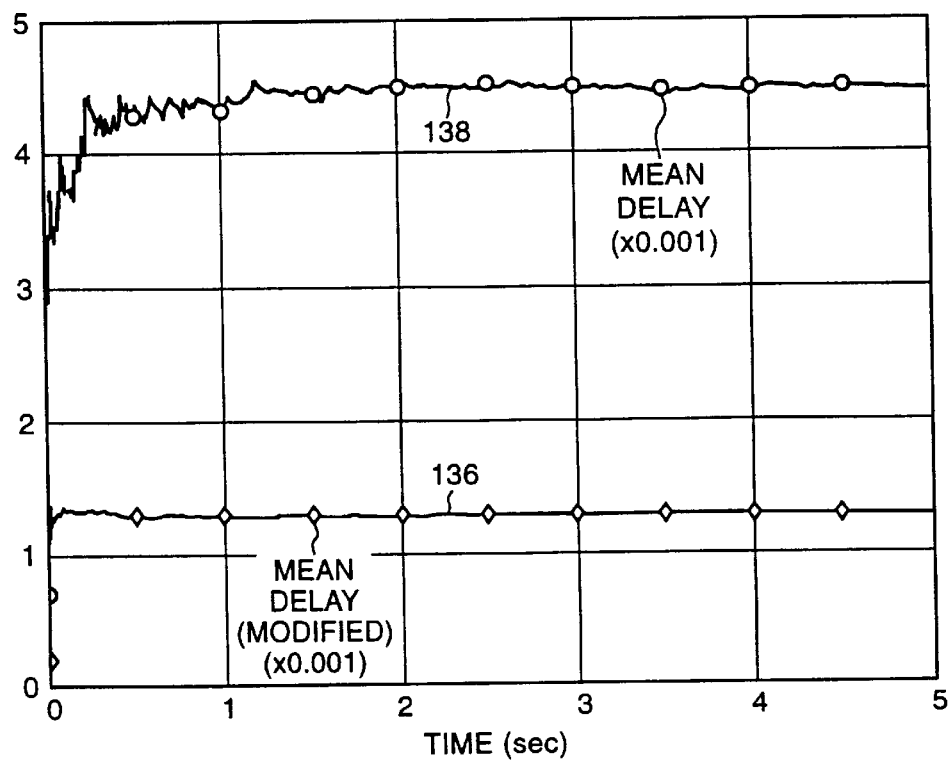

FIGS. 6A and 6B are graphs illustrating the improvement in throughput and mean delay per frame, respectively, in a ten station, 10 MBit/s network when implementing the collision mediation shown in FIG. 3C. As shown in FIG. 6A, the frame throughput 132 when implementing the collision mediation of the present invention is improved by 40% over the frame throughput 134 in a conventional Ethernet network. Similarly, the mean delay 136 when implementing collision mediation of the present invention is reduced by 72% compared to the mean delay 138 in a conventional Ethernet network.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method of accessing media of an Ethernet network, comprising:

sensing deassertion of a receive carrier on the media;

determining a delay time including at least a predetermined interpacket gap interval and a randomized time interval, the randomized time interval randomly selected between and including a propagation delay between two network stations and twice the propagation delay; and attempting access of the media in response to the sensed deassertion and upon expiration of the determined delay time, wherein the determining step comprises generating the randomized time interval having a duration between and including the propagation delay and twice the propagation delay, the two network stations including a network server and a network client, the propagation delay identifying a cable delay between the network server and the network client.

2. A network interface for connection with media of an Ethernet network, comprising:
   a carrier sensor sensing deassertion of a receive carrier on the media;
   a delay time calculator adding a randomized delay interval to a predetermined interpacket gap interval to obtain said delay time, the randomized delay interval randomly selected between one and two times a propagation delay between two network stations; and
   a media access device attempting access of the media in response to the sensed deassertion of the media and after said delay time.

3. The method of claim 1, wherein the network has a data rate of 100 megabits per second and the propagation delay equals up to 2.56 microseconds.

4. The method of claim 1, wherein the network further includes a plurality of clients, the determining step comprising calculating said delay time in each of the clients.

5. The method of claim 4, further comprising:
   generating in the server a second delay time consisting of the predetermined interpacket gap interval; and
   attempting access of the media by the server in response to the sensed deassertion and after the second delay time.

6. The method of claim 1, wherein:
   the network includes and a plurality of said clients;
   the determining step; comprising calculating said delay time in each of the clients attempting access to the media and
   the method further comprising the step of attempting access of the media by the server upon completing waiting the predetermined interpacket gap interval in response to the sensed deassertion.

7. The method of claim 1, further comprising starting a delay timer in response to the sensing step, the attempting step occurring once the delay timer reaches the delay time.

8. The method of claim 1, further comprising:
   sensing a collision on the media;
   determining a collision delay by multiplying a second propagation delay by a first integer randomly selected from a predetermined range of integers; and
   attempting access of the media in response to the sensed collision and after the determined collision delay.

9. The method of claim 8, wherein the collision delay determining step comprises:
   calculating a backoff interval by multiplying a predetermined slot time by a second integer randomly selected from a second range of integers calculated from an exponential number of access attempts; and
   adding the calculated backoff interval to the multiplied second propagation delay to obtain the collision delay.

10. The method of claim 9, wherein the network has a data rate of 10 megabits per second and the predetermined slot time equals 51.2 microseconds.

11. The method of claim 9, wherein the network has a data rate of 100 megabits per second and the predetermined slot time equals 5.12 microseconds.

12. The method of claim 1, further comprising storing the propagation delay in a memory of a network interface card.

13. The method of claim 12, further comprising receiving the propagation delay from the network for storage in the network interface card.

14. A method of managing access to a media of an Ethernet network having a server and clients, comprising:
   assigning a first delay time to the server equal to a predetermined interpacket gap interval;
   enabling the server to access the media in response to deassertion of a receive carrier on the media and after the first delay time;
   assigning a second delay time to each of the clients equal to the predetermined interpacket gap interval plus a time interval randomly selected with respect to a propagation delay between two network stations; and
   enabling each of the clients to access the media in response to the deassertion of said receive carrier and after the second delay time.

15. The method of claim 14, wherein the network has a data rate of one of 10 megabits per second and 100 megabits per second and said predetermined interpacket gap interval is one of 9.6 microseconds and 0.96 microseconds, respectively.

16. The method of claim 14, wherein the second delay time assigning step comprises randomly selecting the time interval from a range between one and two times the propagation delay between the server and one of the clients.

17. The method of claim 16, wherein said randomly selecting step comprises determining a cable delay between the server the one client to obtain said second delay time for said one client.

18. A method of mediating collisions on media of an Ethernet network, comprising:
   sensing a collision on the media;
   determining a collision delay interval by multiplying a propagation delay interval representing a maximum propagation delay between two stations on the network with a randomly selected integer from a predetermined range of integers to obtain a randomized delay interval; and
   attempting access of the media in response to the detected collision and after the collision delay interval.

19. The method of claim 18, wherein the determining step further comprises:
   calculating a backoff interval by multiplying a predetermined slot time by a second integer randomly selected from a second range of integers calculated from an exponential number of access attempts by a network station; and
   adding the calculated backoff interval to the randomized delay interval and the predetermined interpacket gap interval to obtain the collision delay interval.

20. The method of claim 18, wherein the maximum propagation delay is approximately 2.56 microseconds.

21. A method of mediating collisions on media of an Ethernet network, comprising:
   sensing a collision on the media;
   determining a collision delay interval comprising:
   (1) randomly selecting a first integer from a predetermined range of integers,
   (2) randomly selecting a second integer from a second range of integers calculated from an exponential number of access attempts by a network station,
   (3) multiplying a propagation delay interval representing a maximum propagation delay between two stations on the network with the first integer to obtain a first randomized delay interval,
   (4) multiplying the second integer with a predetermined slot time to obtain a second randomized delay interval, and
   (5) adding the first and second randomized delay intervals to obtain the collision delay interval; and
   attempting access of the media in response to the detected collision and after the collision delay interval.

22. The method of claim 21, wherein the second range of integers has a maximum value of $2^{10}-1$.

23. The method of claim 21, wherein the predetermined range of integers is fixed relative to the number of access attempts.

24. The network interface of claim 2, further comprising a collision sensor sensing a collision on the media, the delay time calculator randomly selecting an integer multiple of said maximum value from a predetermined range of multiples to obtain a retry delay time, the media access device reattempting access of the media in response to the sensed collision and after said retry delay time.

25. The method of claim 9, wherein the predetermined range of integers is fixed relative to the number of access attempts.

26. The method of claim 18, wherein the predetermined range of integers is fixed relative to the number of access attempts.

27. The network interface of claim 24, wherein the predetermined range of multiples is fixed relative to the number of retry attempts.

* * * * *